United States Patent
Gautier Graindorge

(10) Patent No.: US 12,092,013 B2
(45) Date of Patent: Sep. 17, 2024

(54) THERMOSTATIC DEVICE FOR REGULATING THE CIRCULATION OF A FLUID, CORRESPONDING THERMOSTATIC VALVE AND METHOD FOR MANUFACTURING SUCH A DEVICE

(71) Applicant: VERNET, Ollainville (FR)

(72) Inventor: Guillaume Gautier Graindorge, Montigny le Bretonneux (FR)

(73) Assignee: VERNET, Ollainville (FR)

( * ) Notice: Subject to any disclaimer, the term of this patent is extended or adjusted under 35 U.S.C. 154(b) by 210 days.

(21) Appl. No.: 17/770,426

(22) PCT Filed: Nov. 5, 2020

(86) PCT No.: PCT/EP2020/081096
§ 371 (c)(1),
(2) Date: Apr. 20, 2022

(87) PCT Pub. No.: WO2021/094186
PCT Pub. Date: May 20, 2021

(65) Prior Publication Data
US 2022/0389857 A1   Dec. 8, 2022

(30) Foreign Application Priority Data

Nov. 13, 2019  (FR) ..................................... 1912651

(51) Int. Cl.
*F01P 7/16*     (2006.01)
*F16K 31/00*    (2006.01)
*F01P 7/14*     (2006.01)

(52) U.S. Cl.
CPC .............. *F01P 7/16* (2013.01); *F16K 31/002* (2013.01); *F01P 2007/146* (2013.01)

(58) Field of Classification Search
CPC ...... F01P 7/16; F01P 2007/146; F16K 31/002
(Continued)

(56) References Cited

U.S. PATENT DOCUMENTS 4,257,553 A * 3/1981 Sliger .................. G05D 23/022
                                              236/34.5
4,313,594 A * 2/1982 Antoniw ................. F16L 37/23
                                              251/357
(Continued)

FOREIGN PATENT DOCUMENTS

EP     0908809 A1     4/1999
FR     2732088 A1     9/1996
FR     0908809 A1 *   4/1999   ................ F01P 7/16

OTHER PUBLICATIONS

PCT/EP2020/081096 International Search Report, Dec. 16, 2020, 2 pages.
(Continued)

*Primary Examiner* — Hung Q Nguyen
*Assistant Examiner* — Anthony Donald Taylor, Jr.
(74) *Attorney, Agent, or Firm* — Soquel Group LLC

(57) ABSTRACT

A device that includes a thermostatic element, with a piston and a body movable along an axis with respect to one another under the effect of the expansion of a thermodilatable material, and a stopper moved axially by the body with respect to a fixed seat so as to open and close a fluid circulation passage. The stopper includes a flexible seal which rests sealingly against the fixed seat in order to close the passage, and a rigid frame which fixedly supports the seal. The frame includes a central portion, mounted around the body to be driven by the body, and a peripheral part, folded towards the axis, partially crushing the seal. The seal is held in place on the frame by being pushed, radially to the axis, directly against the body of the thermostatic element under the effect of crushing the seal by the peripheral portion of the frame.

10 Claims, 7 Drawing Sheets

(58) Field of Classification Search
USPC ........................................................ 165/287
See application file for complete search history.

(56) References Cited

U.S. PATENT DOCUMENTS

| | | | | |
|---|---|---|---|---|
| 4,763,834 A * | 8/1988 | Duprez | ................ | G05D 23/022 |
| | | | | 251/363 |
| 5,603,485 A * | 2/1997 | Schwarz | .............. | G05D 23/021 |
| | | | | 137/516.29 |
| 6,698,720 B2 * | 3/2004 | Bouloy | .................. | F16K 1/465 |
| | | | | 251/332 |
| 2002/0059906 A1 * | 5/2002 | Friesenhahn | ........ | G05D 23/022 |
| | | | | 123/41.1 |
| 2008/0135633 A1 * | 6/2008 | Heldberg | ............. | G05D 23/022 |
| | | | | 236/34.5 |
| 2010/0230504 A1 * | 9/2010 | Pottie | ................... | G05D 23/022 |
| | | | | 219/548 |
| 2010/0251979 A1 * | 10/2010 | Pottie | ................... | G05D 23/022 |
| | | | | 29/446 |
| 2011/0198518 A1 | 8/2011 | Habermann | | |
| 2013/0200167 A1 * | 8/2013 | Auweder | ............... | G05D 23/02 |
| | | | | 236/93 R |
| 2017/0308105 A1 * | 10/2017 | Roman | ..................... | F01P 7/16 |
| 2018/0066761 A1 * | 3/2018 | Da Silva | ............... | F16K 31/002 |

OTHER PUBLICATIONS

FR 1912651, INPI Rapport de Recherche Perliminaire, Jun. 18, 2020, 2 pages.

\* cited by examiner

THERMOSTATIC DEVICE FOR REGULATING THE CIRCULATION OF A FLUID, CORRESPONDING THERMOSTATIC VALVE AND METHOD FOR MANUFACTURING SUCH A DEVICE

CROSS-REFERENCE TO RELATED APPLICATIONS

This application claims benefit under 35 USC § 371 of PCT Application No. PCT/EP2020/081096 entitled THERMOSTATIC DEVICE FOR REGULATING THE CIRCULATION OF A FLUID, CORRESPONDING THERMOSTATIC VALVE AND METHOD FOR MANUFACTURING SUCH A DEVICE, filed on Nov. 5, 2020 by inventor Guillaume Gautier Graindorge. PCT Application No. PCT/EP2020/081096 claims priority of French Patent Application No. 19 12651, filed on Nov. 13, 2019.

FIELD OF THE INVENTION

The present invention also relates to a thermostatic device and a thermostatic valve comprising such a device. The invention further relates to a method for manufacturing such a device.

The invention is particularly concerned with thermostatic devices and valves which are used in the cooling circuits of heat engines, especially those of motor vehicles, heavy-duty vehicles, two-wheelers and stationary engines. However, this field of application is not limiting to the invention, in the sense that the device and the valve according to the invention can be used in various other fluid circuits, for example gearbox cooling circuits, water circuits, oil circuits, etc.

BACKGROUND OF THE INVENTION

In many applications in the fluidic field, especially for cooling thermal engines, thermostatic valves are used to regulate the flow of a fluid, i.e. to distribute the fluid in different flow paths, depending on the temperature of the fluid. These valves are said to be thermostatic, in the sense that the movement of their internal shutter relative to the valve housing is controlled by a thermostatic element, i.e. an element which comprises a body, containing a thermally expandable material, and a piston, immersed in that thermally expandable material. The body and the piston can be moved relative to each other in translation along the longitudinal axis of the piston, with the piston deploying relative to the body when the thermally expandable material expands. By securely connecting the piston to the valve housing, the extension of the thermostatic element body allows the shutter to be driven relative to the housing, thereby opening and closing a fluid flow passage through the housing.

In order to seal the contact between the shutter and a fixed seat in the housing, a seal is known to be integrated in the shutter. This seal, typically made of a flexible material such as rubber or elastomer, is carried by a rigid frame of the shutter, this frame being, in use, connected to the body of the thermostatic element for the purpose of being driven by the thermostatic element. In practice, the seal is held in place on this frame by overmolding, crimping or form-fitting.

Thus, EP 0 908 809 proposes to overmold a flexible seal onto a rigid frame. For its own part, FR 2 732 088 proposes to crimp a seal in an annular groove of a frame, by locally collapsing the seal over its entire periphery by a wall of the groove, folded inwards. FR 2 819 035 also proposes to fit the seal into a groove in the frame, but by folding a wall of the groove inwards against the seal in a loose fit. These known solutions, based on bending a peripheral part of the frame, require the seal to be placed in a dedicated groove in the frame, in which the seal is held in place once the peripheral part of the frame is bent. The cross-sectional area of the frame is therefore significant, due to the presence of this groove around the body of the thermostatic element. This keeps the outside diameter of the shutter quite large.

In order to overcome this dimensional problem and to offer shutters with a smaller diameter, solutions based on an overmolding of the frame are currently used. However, this implies that the flexible material, added by overmolding to form the seal, can only be chosen in certain grades that are compatible with the overmolding operation. In addition, the overmolding operation can lead to additional costs due to cleanliness problems caused by burrs in the flexible material, the presence of adhesive residues, etc.

SUMMARY OF THE DESCRIPTION

The purpose of the present invention is to provide an improved thermostatic shutter device, which, while remaining economical to manufacture, induces fewer dimensional and material constraints.

To this end, the invention relates to a thermostatic device for controlling the circulation of a fluid, including:
- a thermostatic element, which defines an axis and which includes a piston, extending lengthwise along the axis, to be securely connected to a fluid-carrying housing, and a body, substantially centered on the axis, containing a thermally expandable material, the body being movable along the axis relative to the piston so as to expand the piston relative to the body by expansion of the thermally expandable material,
- a shutter, which is axially moveable relative to a fixed seat of the housing so as to open and close a fluid-carrying passage and which is connected to the body of the thermostatic element so that, on expansion of the thermally expandable material, the body of the thermostatic element drives the shutter axially relative to the fixed seat,
- wherein the shutter includes both a flexible seal, which is adapted to be pressed sealingly against the fixed seat to close the fluid-carrying passage, and a rigid frame, which securely supports the seal,
- wherein the frame includes a central portion, which is mounted around the body of the thermostatic element so as to be driven by the body of the thermostatic element on expansion of the thermally expandable material, and a peripheral part, which is folded back towards the axis by partially collapsing the seal,
- and wherein the seal is held in place on the frame by being pressed radially to the axis directly against the body of the thermostatic element, under the effect of the collapsing of the seal by the peripheral portion of the frame.

The invention further relates to a thermostatic valve including a fluid-carrying housing and a thermostatic device, which is as defined above and of which the piston of the thermostatic element is securely connected to the housing while the seal of the shutter is driven together with the body of the thermostatic element and the frame of the shutter relative to the housing so that the seal is moved relative to a fixed seat of the housing to open and close a fluid-carrying passage.

The invention further relates to a method of manufacturing a thermostatic fluid flow control device, including:
- a first assembly step in which a rigid frame of a shutter and a thermostatic element which defines an axis and which includes a piston, extending lengthwise along the axis, and a body, substantially centered on the axis and containing a thermally expandable material, are assembled to each other, the body being movable along the axis relative to the piston so as to deploy the piston relative to the body upon expansion of the thermally expandable material, and wherein a central portion of the frame is mounted around the body of the thermostatic element so as to be driven by the body of the thermostatic element upon expansion of the thermally expandable material,
- a second assembly step, in which a flexible seal is fitted to the frame, around the body of the thermostatic element, in direct radial contact with the body of the thermostatic element, and
- a crimping step, in which a peripheral part of the frame is crimped towards the axis so that the seal is partially collapsed by the peripheral part of the frame and thus held in place on the frame by being pressed, radially to the axis, directly against the body of the thermostatic element under the effect of the collapsing of the seal by the peripheral part of the frame.

One of the ideas behind the invention is to use the body of the thermostatic element directly to hold the seal in place on the frame, thus avoiding the need for the frame to incorporate a dedicated groove or other similar arrangement, which would increase the transverse dimension of the shutter. According to the invention, the seal is mounted directly around the body of the thermostatic element and is pressed radially against that body by the effect of the seal being collapsed by the peripheral part of the frame, folded towards the central axis of the thermostatic element. The radial stop formed by the body of the thermostatic element with respect to the seal is effective both during the deformation of the seal resulting from the compression of the latter by the progressively folded peripheral wall, and after the device has been manufactured in accordance with the invention. The transverse dimension of the device, at the axial level where the seal is located, is limited to the sum of the diameter of the thermostatic element body and the radial thickness of the seal, since no part of the frame is radially interposed between the thermostatic element body and the seal. The device according to the invention can therefore be provided with a small outer diameter. Furthermore, as the invention does not require any overmolding operation, the manufacturing cost and material constraints of the seal are limited. Further advantageous aspects of the device and method according to the invention will be discussed below.

In addition, advantageous features of the device and/or method according to the invention are specified:
The body of the thermostatic element includes:
- a barrel, which is arranged axially opposite the piston and in which the thermally expanding material is stored,
- a flange which borders one end of the barrel, facing axially towards the piston, and
- a shoulder which connects the flange to said end of the barrel, the central part of the frame being mounted around the barrel and being arranged in mechanical interference with the shoulder along the axis, and the seal being mounted around and supported, radially to the axis, against the flange.

The seal is partially embedded between the shoulder and the frame by deformation.
The frame further comprises an intermediate part, which connects the central part and the peripheral part of the frame to each other and which, on its side facing axially towards the seal, has an axial bearing surface for a region of the seal collapsed by the peripheral part of the frame.
The intermediate part of the frame has, on its side facing the seal axially, a recess for receiving a bulging region of the seal.
The intermediate part of the frame has, on its side facing axially away from the seal, a centering relief for a return spring which, on contraction of the thermally expandable material, retracts the piston into the body of the thermostatic element and drives the shutter axially with respect to the fixed seat.
Before being attached to the frame, the seal has a plane of symmetry which, in the second assembly step, extends perpendicular to the axis.
in the second assembly step, the seal is pressed tightly around the body of the thermostatic element.

BRIEF DESCRIPTION OF THE DRAWINGS

The invention will be better understood upon reading the following description, given only as an example, and with reference to the drawings, in which.

DETAILED DESCRIPTION OF EMBODIMENTS

FIGS. 1 to 4 show a thermostatic device 1 for controlling the flow of a fluid. The thermostatic device 1 is shown alone in FIGS. 1 to 3, while in FIG. 4 the thermostatic device 1 is shown within a thermostatic valve 2. The fluid controlled by the thermostatic device 1 is, for example, a cooling fluid, the valve 2 belonging in particular to a thermal engine cooling circuit, in particular of a motor vehicle engine, this example not being, however, limiting, as mentioned in the introductory part of the present document.

Figure 4:
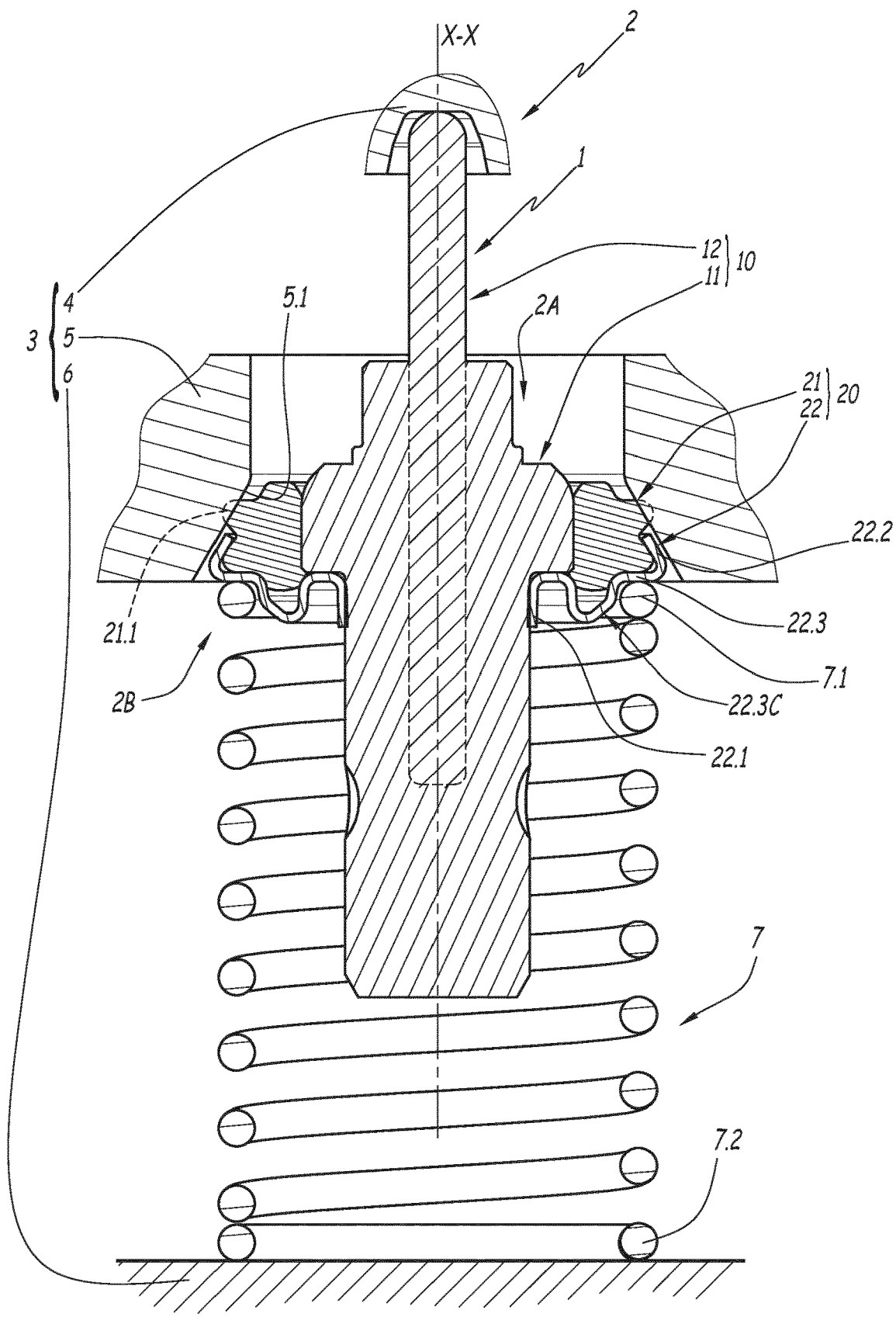
FIG. 4 is a longitudinal cross-section of a thermostatic valve comprising the device of FIG. 1.

As shown in FIG. 4, the thermostatic valve 2 comprises a housing 3 including parts 4, 5 and 6 in which the thermostatic device 1 is arranged. The parts 4, 5 and 6 of the housing 3 are fixed to each other, e.g. by being integral and/or securely connected when the thermostatic valve 2 is in operation as shown in FIG. 4. In practice, in FIG. 4, the parts 4, 5 and 6 of the housing 3 are only partially and schematically shown, their form of implementation not being limiting to the invention. In any case, when the thermostatic valve 2 is in its service configuration, the housing 3 channels the fluid, defining fluid-carrying paths 2A and 2B: one of these paths constitutes a fluid inlet while the other path constitutes a fluid outlet. For example, when the thermostatic valve 2 is part of an engine cooling circuit, channel 2A constitutes a cooling fluid inlet, coming from the engine that is to be cooled, while channel 1B constitutes an outlet for this cooling fluid, sending it, for example, to a heat exchanger, such as a radiator, designed to lower the temperature of the fluid passing through it, before this fluid is returned to the engine that is to be cooled.

The thermostatic device 1 comprises a thermostatic element 10 which is centered on a geometric axis X-X. The thermostatic element 10 includes a body 11, centered on the axis X-X and containing a thermo-dynamic material such as a wax. The thermostatic element 10 further comprises a piston 12 which extends lengthwise along the axis X-X, advantageously being centered on this axis. An axial end portion of the piston 12 is plunged into the thermally expandable material contained in the body 11.

For convenience, the remainder of the description is oriented with respect to the X-X axis, so that the terms "upper", "top" and the like refer to an element which, in the direction of the X-X axis, faces upwards in FIGS. 1 to 4, whereas the terms "lower", "bottom" and the like refer to an element facing in the opposite direction. Thus, in the example considered here, the piston 12 is arranged above the body 11, its end portion, immersed in the body 11, being its lower end portion, while its end portion emerging from the body 11 is its upper end portion.

In the embodiment considered in the Figures, the body 11 includes a lower barrel 11.1, which is arranged axially opposite the piston 12 and in which the thermally expandable material is stored. In addition, the body 11 includes an upper flange 11.2 which is arranged radially protruding from the barrel 11.1 bordering an upper end of this barrel, i.e. an end of the barrel facing axially towards the piston 12. At the junction between the barrel 11.1 and the flange 11.2, the body 11 forms a shoulder 15 connecting the barrel and the flange to each other. For reasons that will become apparent later, the shoulder 11.3 is chamfered at its junction with the flange 11.2, as is clearly visible in FIG. 3.

The body 11 and the piston 12 of the thermostatic element 10 are movable relative to each other along the axis X-X, typically in translation along this axis: under the effect of an expansion of the thermally expandable material, the piston 12 deploys out from the body 11 while, during a contraction of the thermally expandable material, the piston 12 retracts into the body 11 under the effect of a return spring 7 described later.

In the thermostatic valve 2, when in operation, the piston 12 of the thermostatic element 10 is securely connected to the housing 3. More precisely, in a manner known per se, the upper end part of this piston 12 is securely connected to part 4 of the housing 3, arranged across the axis X-X. In practice, various forms of implementation are conceivable with regard to the secured connection of the upper end part of the piston 12 to the part 4 of the housing 3: this secured connection can be made either solely by axial support, as in the example illustrated in FIG. 4, or by removable securing, of the clipping or sliding fitting type, or by secured connection of the press-fitting, overmolding or addition of a mechanical holding system type. In any case, it is understood that when the thermally expandable material contained in the body 11 expands or contracts, the piston 12 is kept immobile with respect to the housing 3, due to the secured connection of its upper end part to the housing part 4.

The thermostatic device 1 further comprises a shutter 20 which is movable along the axis X-X with respect to a fixed seat 5.1 of the part 5 of the housing 3, so as to open and close a fluid-carrying passage defined between that seat and the shutter: within the thermostatic valve 2 in use, when the shutter 20 is pressed against the seat 5.1 as in the operating configuration shown in FIG. 4, this shutter closes the aforementioned passage and therefore prevents the flow of fluid between the channels 2A and 2B, whereas, when the shutter 20 is moved away from the seat 5.1, the shutter 20 opens the aforementioned passage and therefore allows the flow of fluid between the channels 2A and 2B.

In order to control the movement of the shutter 20, the shutter 20 is connected to the body 11 of the thermostatic element in such a way that, within the thermostatic valve 2 when it is in service, the axial displacement of the body 11 with respect to the housing 3, resulting from the expansion of the thermally expandable material, causes a corresponding movement of the shutter 20 in such a way as to open the aforementioned passage, by axially separating that shutter from the fixed seat 5.1.

To control the closing of the aforementioned passage, the shutter 20 is driven towards the seat 5A by the aforementioned spring 7. In the thermostatic valve 2, this spring 7 is interposed and compressed, along the X-X axis, between the shutter 20 and the part 6 of the housing 3, an upper end turn 7.1 of the spring 7 being pressed axially upwards against the lower face of the shutter 20, while a lower end turn 7.2 is pressed axially downwards against the part 6 of the housing 3.

Figure 1:
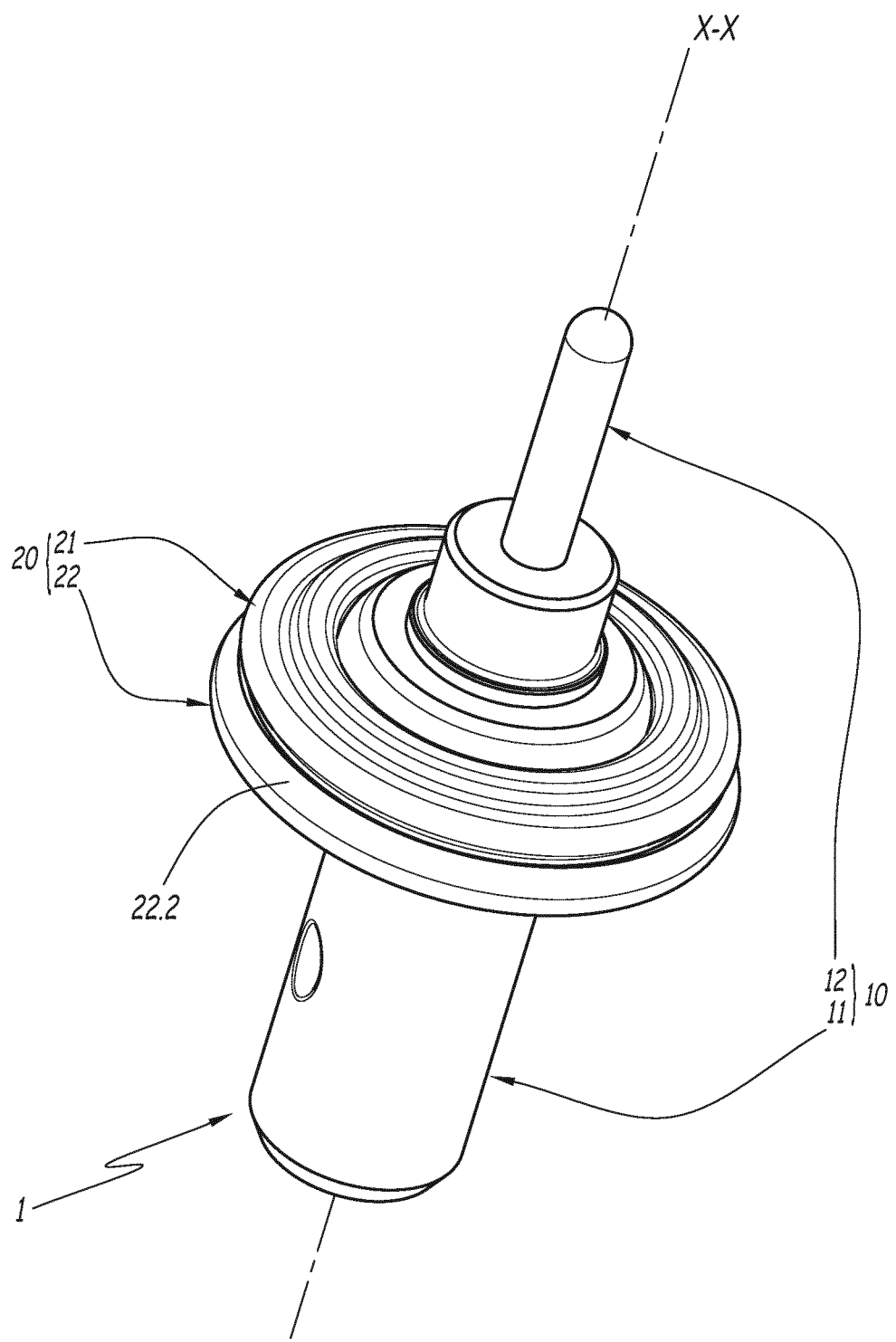
FIG. 1 is a perspective view of a thermostatic device according to the invention.
Figure 2:
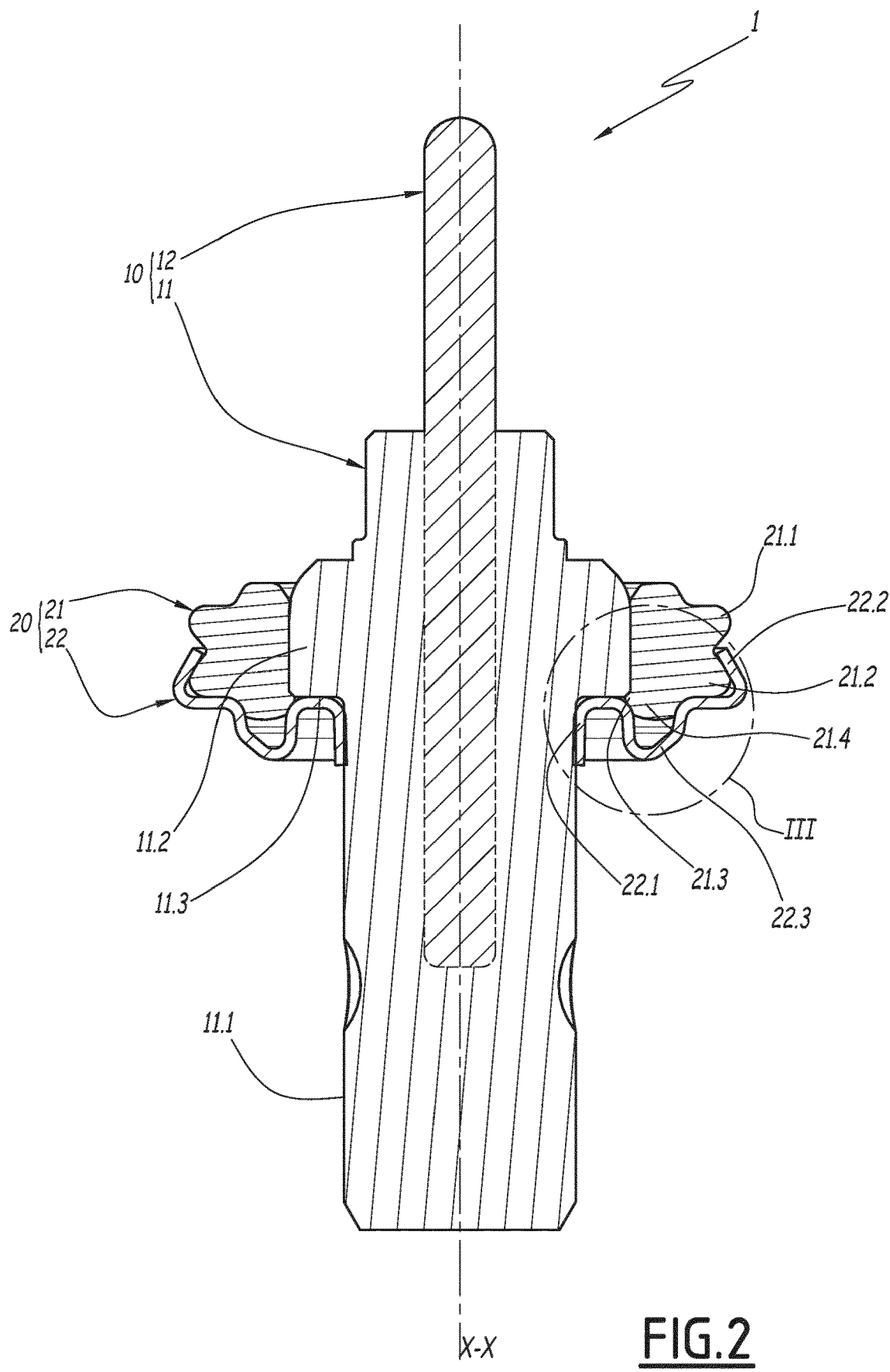
FIG. 2 is a longitudinal cross-section of the thermostatic device of FIG. 1.
Figure 3:
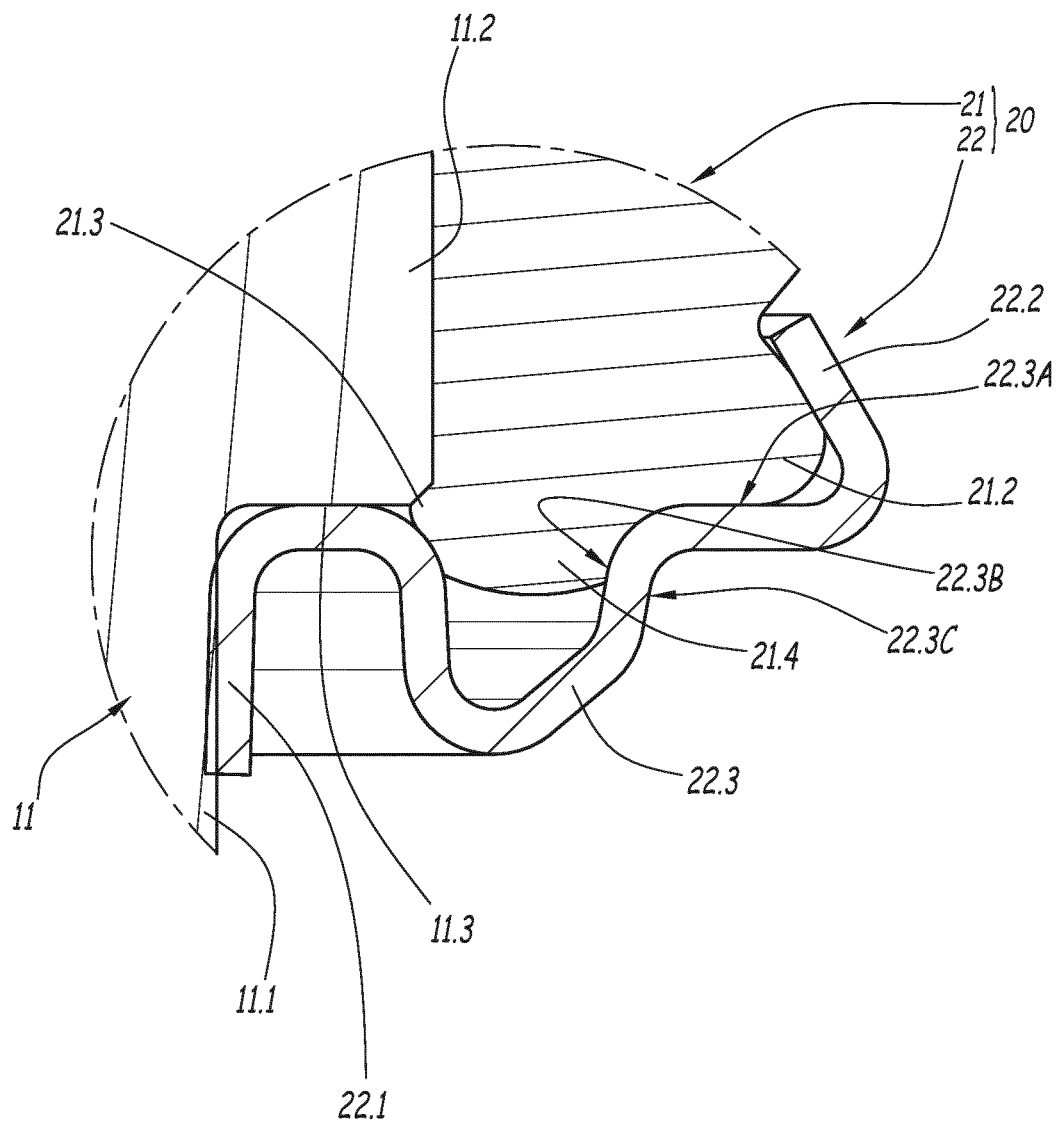
FIG. 3 is an enlarged view of the detail circled as III in FIG. 2.

As can be seen from FIGS. 1 to 3, the shutter 20 comprises a seal 21 and a frame 22. In this example, the seal 21 and the frame 22 together constitute the shutter 20.

The seal 21 is made of elastomer or rubber or, more generally, of a flexible material, in particular in comparison with the frame 22, so that the seal 21 is designed, when the shutter 20 closes the aforementioned fluid-carrying passage, to be pressed in a flexible, or even elastic, manner against the seat 5.1 of the part 5 of the housing 3 and thus to seal off the contact between that seat and the shutter. Thus, the seal 21 can be described as a seal for the shutter 20, with the understanding that the seal 21 extends all around the axis X-X, as clearly visible in FIG. 1. The region of the seal 21, thus designed to cooperate by bearing with the seat 5.1 of the housing 3, is referenced 21.1: unlike FIGS. 1 and 2, in which the region 21.1 of the seal 21 is represented in solid lines, this region 21.1 of the seal 21 is shown in dotted lines in FIG. 4 in order to schematically illustrate that, in the operating configuration illustrated by FIG. 4, the region 21.1 of the seal 21 interferes mechanically with the seat 5.1 of the housing 3, being at least partially collapsed and thus inducing a local deformation of the seal 21.

The frame 22 is made of a metallic material or, more generally, of a rigid material, especially compared to the seal 21. The frame 22 is designed to securely support the seal 21, as explained in more detail below, so that in the assembled state of the thermostatic device 1 within the thermostatic valve 2, the seal 21 is driven together with the frame 22 and the body 11 of the thermostatic element 10 relative to the housing 3 for the purpose of moving the seal relative to the seat 5.1 of the housing 3.

The frame 22 is arranged coaxially and around the body 11 of the thermostatic element 10, ensuring the connection between the shutter 20 and this body 11. In the embodiment considered in the Figures, the frame 22 has a generally annular shape which, in the assembled state of the thermostatic device 1, is centered on the axis X-X and surrounds the body 11 of the thermostatic element 10 over a limited axial height of this body 11. Thus, the shutter 20 is similar to a flap.

As can be seen in FIGS. 2 to 4, the frame 22 comprises a central part 22.1, facing the axis X-X, and a peripheral part 22.2, facing away from this axis X-X. In the embodiment considered in the figures, the central part 22.1 and the peripheral part 22.2 are connected to each other by an intermediate part 22.3 of the frame 22. These different parts 22.1, 22.2 and 22.3 of the frame 22 extend around the X-X axis.

The central part 22.1 of the frame 22 is mounted around the body 11 of the thermostatic element 10 in such a way as to ensure the connection between the shutter 20 and this body 11, in particular in such a way that this central part 22.1 and thus the frame 22 are carried along by the body 11 of the thermostatic element 10 when the thermally expandable material of the thermostatic element expands. To this end, in the example embodiment considered here, the central part 22.1 consists of a ring with an inverted L-shaped cross-section, including a tubular lower wall, encircling the barrel 11.1 of the body 11, and a transverse upper wall, bearing axially against the shoulder 11.3 of the body 11. Of course, other embodiments are conceivable for the central part 22.1, in particular embodiments which, as they do for the aforementioned ring, provide that the central part 22.1 is mounted around the barrel 11.1 and is arranged in mechanical interference with the shoulder 11.3 along the axis X-X. Furthermore, according to a practical and effective embodiment, the connection between the body 11 of the thermostatic element 10 and the frame 22 is fixed, i.e. without the possibility of relative movement between them: in this case, the central part 22.1 is advantageously fitted tightly around the body 11, in particular its barrel 11.1.

The peripheral part 22.2 of the frame 22 is shaped so as to pinch the seal 21. More precisely, as clearly visible in FIGS. 1 and 2, the peripheral part 22.2 is folded towards the axis X-X by partially collapsing the seal 21, the corresponding collapsed region of the seal 21 being referenced 21.2 in the Figures. In this example, the peripheral part 22.2 consists of an inclined wall with a frustoconical shape, centered on the X-X axis and converging upwards. Regardless of the embodiment, the peripheral part 22.2 pinches the region 21.2 of the seal 21, collapsing this region 21.2 towards the axis X-X by means of local deformation of the flexible material constituting the seal 21. The collapsed region 21.2 is located axially below the region 21.1 of the seal 21, this region 21.1 not being covered by the peripheral part 22.2 of the frame 22.

The seal 21, thus stressed by collapsing by the peripheral part 22.2 of the frame 22, is held in place on this frame 22 by being pressed, radially to the axis X-X, directly against the body 11 of the thermostatic element 10. The seal 21 is thus embedded, radially to the X-X axis, between the peripheral part 22.2 and the body 11 of the thermostatic element 10. In the embodiment considered in the Figures, the seal 21 is thus mounted around and supported, radially to the axis X-X, against the flange 11.2 of the body 11. In any case, the radial support of the seal 21 against the body 11 of the thermostatic element seals the contact interface between them, particularly with respect to the aforementioned fluid.

Along the X-X axis, the seal 21 is held axially with respect to the frame 22 by the peripheral part 22.2 of the frame 22 at the top and by the rest of the frame 22 at the bottom, in particular by the intermediate part 22.3. The intermediate part 22.3 thus advantageously has, on its upper side, an axial support surface 22.3A for the region 21.2 of the seal 21, as clearly visible in FIG. 2.

According to an optional advantageous arrangement, more particularly visible in FIG. 3, the seal 21 is, by deformation, partially accommodated axially between the shoulder 11.3 of the body 11 of the thermostatic element 10 and the frame 22, the corresponding region of the seal 21 being referred to as 21.3. The formation of this region 21.3 of the seal 21 results from the deformation of the seal 21 in the assembled state of the thermostatic device 1 and is advantageously facilitated by the chamfer of the shoulder 11.3 at the junction with the flange 11.2 and/or by a rounding at the junction between the central part 22.1 and the intermediate part 22.3 of the frame 22. In any case, the region 21.3 of the seal 21 provides an upward axial anchorage for the seal 21 with respect to the body 11 of the thermostatic element.

In a further advantageous optional arrangement, which is more particularly visible in FIG. 3, the intermediate part 22.3 has, on its upper side, a recess 22.3B located, radially to the axis X-X, between the central part 22.1 and the axial support surface 22.3A. This recess 22.3B of the intermediate part 22.3 is provided to accommodate the deformation of the seal 21 in the assembled state of the thermostatic device 1, by receiving a bulging region 21.4 of the seal 21, resulting from the collapsing of the seal 21 in the assembled state of the thermostatic device 1. By providing that the recess 22.3B is constricted downwards, the bulging region 21.4 of the seal 21 tends to wedge into the recess 22.3B, thereby enhancing the axial restraint of the seal 21 on the frame 22.

In a further advantageous optional arrangement, which may be combined with the above, the intermediate part 22.3 of the frame 22 has a relief 22.3C on its lower side. This relief 22.3C is designed to center, on the X-X axis, the upper end turn 7.1 of the return spring 7, pressed axially upwards against the lower face of the frame 22. In the example shown in the figures, the relief 22.3C mates with the spiral 7.1 in a form-fitting manner and is housed in a substantially fitted manner within the spiral 7.1.

Figure 5:
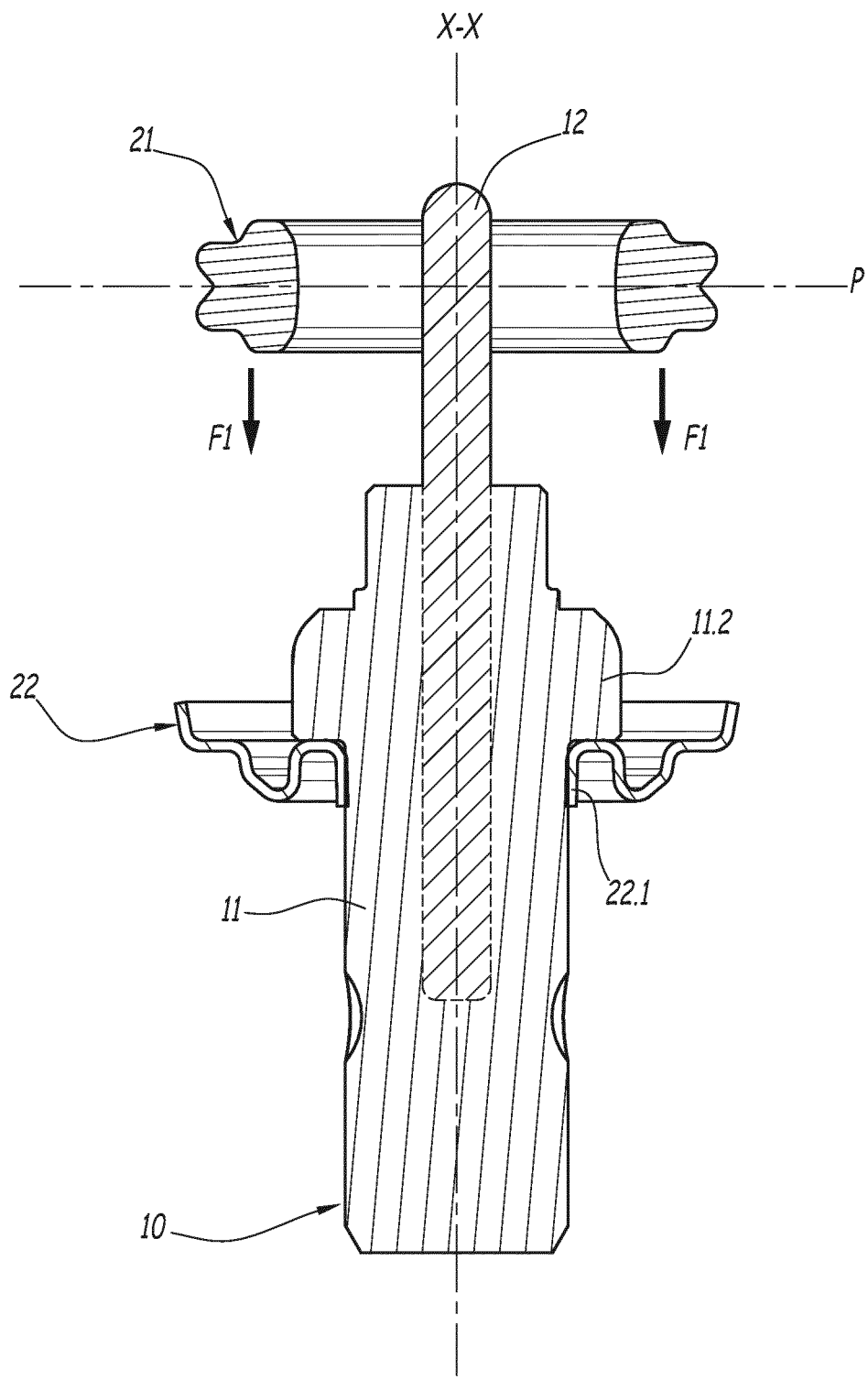
FIG. 5 is a longitudinal cross-section of some components of the device of FIG. 1, illustrating the assembly of these components.
Figure 6:
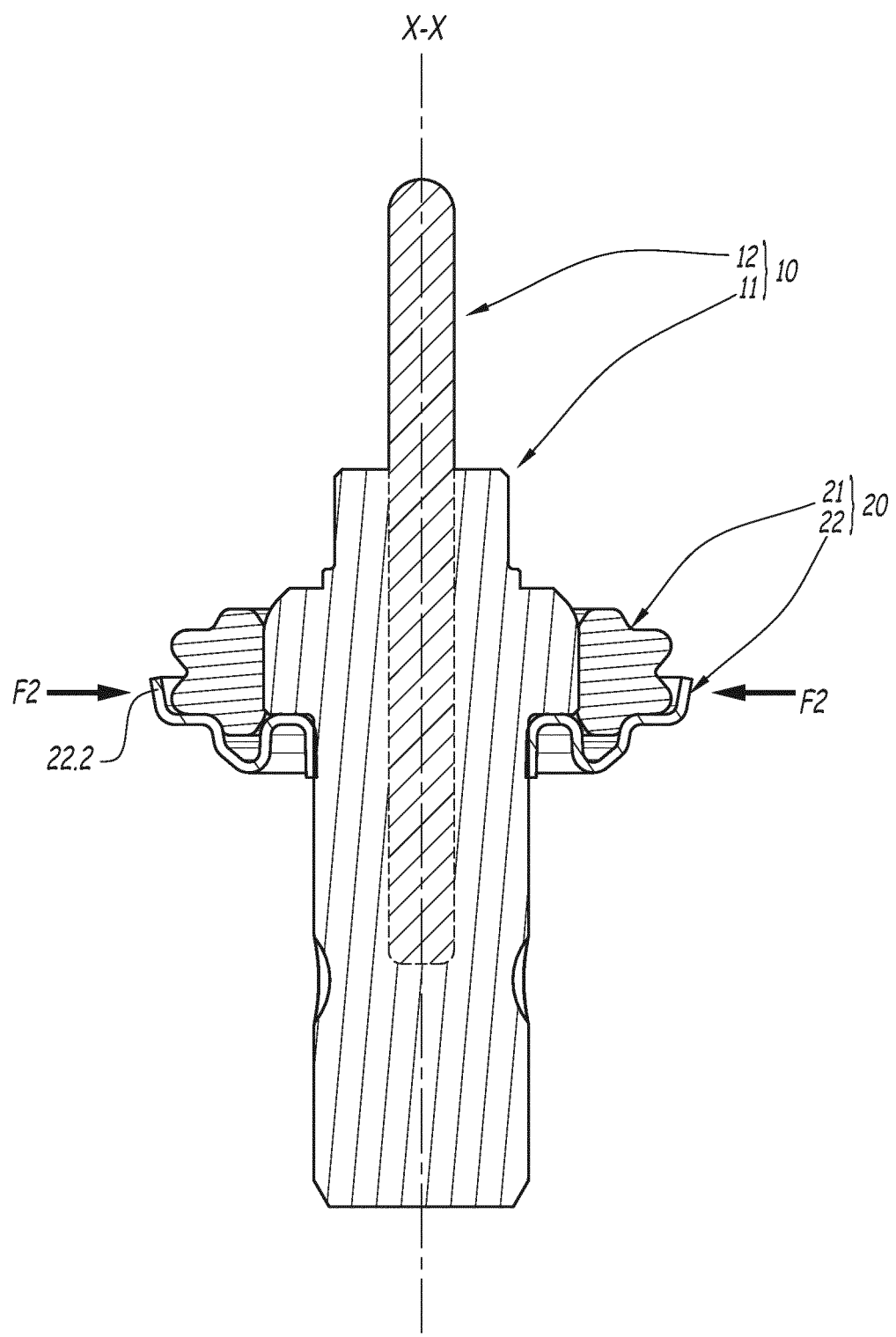
FIG. 6 is a view similar to FIG. 5, illustrating an assembly step subsequent to that shown in FIG. 5.

FIGS. 5 and 6 illustrate an example of a manufacturing method for the thermostatic device 1.

In FIG. 5, the thermostatic element 10 and the frame 22 are shown already assembled to each other. This connection between the frame 22 and the body 11 is achieved by fitting the central part 22.1 of the frame 22 around the body 11 so that they are connected as described above. Before being connected to the body 11, the frame 22 is produced by folding and/or deep-drawing a sheet metal.

In the assembly step shown in FIG. 5, the seal 21 is fitted to the frame 22 around the body 11 of the thermostatic element 10, being brought into direct radial contact with this body 11. In practice, as indicated by the arrows F1 in FIG. 5, the seal 21 is threaded axially around the body 11 from the upper end of the body 11 until it reaches the frame 22, where it is wrapped around the flange 11.2. According to a preferred procedure, the seal 21 is thus slipped around the body 11 so that it is pressed tightly around that body 11: for this purpose, as illustrated in FIG. 5, the internal diameter of the seal 21 is provided to be smaller than the external diameter of the flange 11.2 and/or the profile of the seal 21, turned towards the axis X-X, is curved towards this axis. Such a tight fit of the seal 21 around the body 11 improves the mechanical strength and sealing of the interface between the seal 21 and the body 11 in the assembled state of the thermostatic device 1.

Furthermore, according to a particularly advantageous optional arrangement, which is implemented in the example embodiment considered in the figures, the seal 21 has, before its assembly to the rest of the thermostatic device 1, a plane of symmetry P which, during the assembly of the seal 21 to the rest of the thermostatic device 1, extends perpendicularly to the axis X-X. Thus, as can be seen in FIG. 5, the axial side of the seal 21 facing the frame 22 when the seal 21 is fitted to this frame is irrelevant, which facilitates the manufacturing method.

Once the seal 21 is in place on the frame 22, a crimping step is carried out, as shown in FIG. 6. The peripheral part 22.2 of the frame 22 is progressively crimped towards the X-X axis, as indicated by the arrows F2 in FIG. 6. The seal 21 is then both partially collapsed by the peripheral part 22.2 and pressed, radially to the axis X-X, directly against the body 11 of the thermostatic element 10. Through the deformation of the seal 21, the formation of the seal's region 21.2, collapsed by the peripheral part 22.2, induces the formation of the regions 21.3 and 21.4 detailed above.

Figure 7:
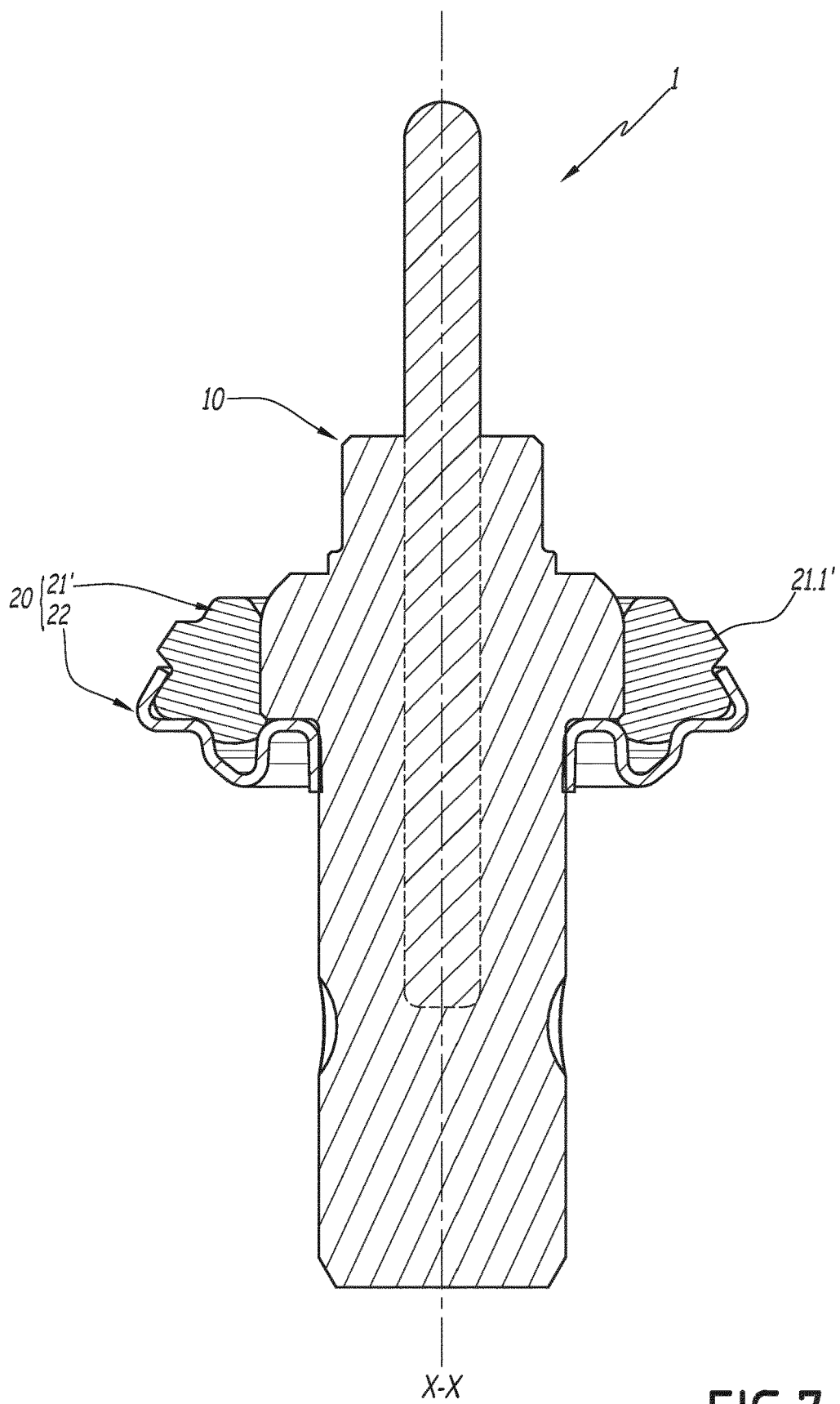
FIG. 7 is a view similar to FIG. 2, illustrating a variant of the thermostatic device according to the invention.

FIG. 7 shows a variant of the thermostatic device 1 whose thermostatic element and frame are identical to those in the previous figures and therefore have the same references, 10 and 22 respectively. The variant of FIG. 7 differs from the previous figures by its seal, which is referenced 21' and which differs from seal 21 essentially by its region 21.1' intended to mate with the seat 5.1 of the housing 3 of the thermostatic valve 2. Indeed, rather than having a rounded profile as for the region 21.1 of the seal 21, the region 21.1' of the seal 21' is beveled, forming a frustoconical surface, centered on the X-X axis and converging upwards.

The variant shown in FIG. 7 illustrates the multitude of shapes that the seal 21 can take, particularly in its region intended to mate with the seat 5.1 of the housing 3.

In addition, various modifications and variants of the thermostatic device 1 and its production method, as well as of the thermostatic valve 2, described above, are also possible. For example:

rather than being securely connected to the body 11 of the thermostatic element 10, the shutter 20 can be mounted on this body 11 with freedom of movement along the axis X-X, provided that it is associated with a dedicated return spring; the shutter 20 then incorporates a relief function in the event of overpressure in the channel 2A; in this respect, the reader may refer to WO 2015/104325;

the embodiment of the thermostatic element 10 is not limiting, in the sense that this element can optionally be controlled, i.e. incorporating an electric heating element, or have various diameters, etc.; and/or the body 11 of the thermostatic element 10 can, at its lower end, be provided with a downward extension, which movably carries a shutter other than the shutter 20, in particular in order to control the flow of fluid in another path of the thermostatic valve 2 to regulate a bypass function, for example within an engine cooling circuit.

The invention claimed is:

1. A thermostatic device for controlling a flow of a fluid, the thermostatic device comprising:
a thermostatic element, which defines an axis and which comprises:
a piston, extending lengthwise along the axis and securely connected to a fluid-carrying housing; and
a body, substantially centered on the axis and containing a thermally expandable material, the body being movable along the axis relative to said piston so as to extend said piston relative to the body via expansion of the thermally expandable material; and
a shutter, which is movable along the axis relative to a fixed seat of the housing so as to open and close a fluid-carrying passage and which is connected to said body of said thermostatic element so that, via expansion of the thermally expandable material, said body of said thermostatic element drives the shutter axially relative to the fixed seat, the shutter comprising:
a flexible seal, which is adapted to be pressed sealingly against the fixed seat to close the fluid-carrying passage; and
a rigid frame, which securely supports the seal, the frame comprising:
a central portion, which is mounted against said body of said thermostatic element so as to be driven by said body of said thermostatic element via expansion of the thermally expandable material; and
an end peripheral part, which is folded back towards the axis and inclined relative to the axis to partially crush said seal, and thereby press said seal radially towards the axis directly against said body of said thermostatic element so as to hold said seal in place on the frame.

2. The thermostatic device according to claim 1, wherein said body of said thermostatic element comprises:
a barrel, which is arranged axially away from said piston and in which the thermally expandable material is stored;
a flange, which borders an end of said barrel, radially protruding from the barrel; and
a shoulder, which connects said flange to the end of said barrel, wherein said central portion of said frame is mounted around said barrel and is arranged in mechanical interference with said shoulder along the axis, and
wherein said seal is mounted around the axis and bears radially against said flange.

3. The thermostatic device according to claim 2, wherein said seal is, via deformation of said seal, partially accommodated between said shoulder and said frame.

4. The thermostatic device according to claim 1, wherein said frame further comprises an intermediate part, which connects said central portion and said end peripheral part of said frame to each other and which, on a side of the intermediate part facing axially towards said seal, has an axial bearing surface for a region of said seal collapsed by said end peripheral part of said frame.

5. The thermostatic device according to claim 4, wherein said intermediate part of said frame has, on the side facing axially towards said seal, a recess for receiving a bulging region of said seal.

6. The thermostatic device according to claim 4, wherein said intermediate part of said frame has, on a side facing axially away from said seal, a centering relief for a return spring, which, via contraction of the thermally expandable material, retracts said piston into said body of said thermostatic element and drives said shutter axially with respect to the fixed seat.

7. A thermostatic valve, comprising:
a thermostatic device according to claim 1, the thermostatic valve further comprising the fluid-carrying housing, such that
said piston of said thermostatic element is securely connected to said housing while said seal of said shutter is driven together with said body of said thermostatic element and said frame of said shutter relative to said housing in such a way that said seal is moved relative to the fixed seat of said housing to open and close the fluid-carrying passage.

8. A method of manufacturing a thermostatic device for controlling a flow of a fluid, the method comprising:
a first assembly step, in which a thermostatic element which defines an axis and which comprises a piston extending lengthwise along the axis and a body substantially centered on the axis and containing a thermally expandable material, is assembled to a rigid frame of a shutter, the body being movable along the axis relative to the piston so as to deploy the piston relative to the body via expansion of the thermally expandable material, and wherein a central portion of the frame is mounted around the body of the thermostatic element so as to be driven by the body of the thermostatic element;

a second assembly step, in which a flexible seal is fitted to the frame, around the body of the thermostatic element and in direct radial contact with the body of the thermostatic element; and a crimping step, in which an end peripheral part of the frame is folded back towards the axis and inclined relative to the axis by crimping so that the seal is partially crushed and thereby pressed radially towards the axis, directly against the body of the thermostatic element to hold the seal in place on the frame.

9. The method according to claim 8, wherein the seal has a plane of symmetry prior to being fitted to the frame, said plane of symmetry extending perpendicularly to the axis.

10. The method according to claim 8, wherein in said second assembly step, the seal is pressed tightly around the body of the thermostatic element.

* * * * *